United States Patent [19]
Muller et al.

[11] Patent Number: 5,647,645
[45] Date of Patent: Jul. 15, 1997

[54] SOLENOID VALVE FOR REGULATING HYDRAULIC PRESSURE AND APPLICATION TO BRAKING CIRCUITS

[75] Inventors: Philippe Muller, Argenteuil; Philippe Bourlon, Aubervilliers; Jean Pierre Michon, Saint Pathus; Patrick Audrain, Tremblay-en-France, all of France

[73] Assignee: AlliedSignal Europe Services Techniques, Drancy, France

[21] Appl. No.: 537,712
[22] PCT Filed: Sep. 20, 1995
[86] PCT No.: PCT/FR95/01205
§ 371 Date: Oct. 17, 1995
§ 102(e) Date: Oct. 17, 1995
[87] PCT Pub. No.: WO96/11828
PCT Pub. Date: Apr. 25, 1996

[30] Foreign Application Priority Data

Oct. 13, 1994 [FR] France ................ 94 12185

[51] Int. Cl.⁶ .......................... B60T 8/32; F15B 13/044
[52] U.S. Cl. .......................... 303/119.2; 303/117.1; 137/596.17; 91/433
[58] Field of Search .......................... 303/119.2, 119.1, 303/117.1, 113.1, 116.1, 113.5, 186, 15; 137/596.17, 625.65; 91/433, 459; 251/129.08, 129.02, 129.15, 129.21, 129.22; 188/349

[56] References Cited

U.S. PATENT DOCUMENTS

| | | | |
|---|---|---|---|
| 4,915,659 | 4/1990 | Hashida et al. | 303/117.1 |
| 4,940,295 | 7/1990 | Adachi et al. | |
| 5,186,093 | 2/1993 | Kervagoret | 303/119.2 |
| 5,191,827 | 3/1993 | Kervagoret | 303/119.2 |
| 5,234,030 | 8/1993 | Kervagoret et al. | 303/119.2 |
| 5,261,731 | 11/1993 | Yogo et al. | 303/116.1 |
| 5,333,947 | 8/1994 | Kervagoret | 303/119.2 |
| 5,404,791 | 4/1995 | Kervagoret | 303/119.2 |
| 5,410,943 | 5/1995 | Kervagoret | 303/119.2 |
| 5,431,489 | 7/1995 | Lee | 303/117.1 |
| 5,588,463 | 12/1996 | Kervagoret | 303/119.2 |

FOREIGN PATENT DOCUMENTS

| | | |
|---|---|---|
| 0452174 | 10/1991 | European Pat. Off. . |
| 3412351 | 10/1985 | Germany . |
| 4036940 | 8/1991 | Germany . |
| 4122282 | 1/1992 | Germany . |
| 9315939 | 8/1993 | WIPO . |

*Primary Examiner*—Douglas C. Butler
*Attorney, Agent, or Firm*—Leo H. McCormick, Jr.

[57] ABSTRACT

A proportional solenoid valve for regulating pressure of fluid supplied to a system. The solenoid valve has high-pressure inlet (1), a low-pressure inlet (2) and an outlet (3) through which fluid under controlled pressure is supplied to the system. The solenoid valve has a body (4) with bore (5) therein for retaining a regulating slide valve (9). The regulating slide valve (9) is subjected to a pressure acting on a cross-section (S), to the force of a spring (10) and to a force exerted by an electromagnet (14,15). Movement of the slide valve brings about a communication between the high-pressure inlet (1) and the outlet (3) and communication between the low-pressure inlet (2) and the outlet (3) as a function of a control valve (16). The control valve (16) is located between the high-pressure inlet (1) and the outlet (3) and the high-pressure inlet (1) and low-pressure inlet (2) are isolated from one another by the slice valve (9) as long as said control valve is not open.

4 Claims, 7 Drawing Sheets

SOLENOID VALVE FOR REGULATING HYDRAULIC PRESSURE AND APPLICATION TO BRAKING CIRCUITS

The invention relates mainly to a proportional solenoid valve for regulating the pressure of a hydraulic fluid, this valve being provided with a high-pressure inlet, with a low-pressure inlet, and with an outlet on which it can deliver a controlled pressure, this solenoid valve comprising:

a body pierced with a bore connecting first and second end chambers together, these further being connected to one another permanently by a duct;

a regulating slide valve sliding within the bore and having a cross-section for differential pressure capable of constituting the seat of application of a first force capable of urging this slide valve towards the first end chamber;

an elastic means exerting a second force, pointing in the opposite direction from the first, on the slide valve;

first and second orifices passing through the body and emerging in the bore respectively close to the first and second chambers, one of these orifices being connected to the high-pressure inlet;

a casing mounted in the extension of the body in order to close off the second end chamber in hermetic fashion, and in which there are housed an electric coil and a magnetic core plunger, this core plunger being capable of sliding in order to exert a third force in the same direction as the first on the slide valve; and a valve placing the second end chamber selectively in communication with a third orifice made in the casing, this valve including a shut-off member which can be shifted from its shut-off position by the core plunger against a return force, and which is able, after a non-zero travel, in turn to transmit the said third force to the slide valve, the latter being capable of bringing about a first communication between the high-pressure inlet and the outlet, and a second communication between the low-pressure inlet and the outlet, and favouring the second communication over the first for increasing values of the third force.

A solenoid valve of this type is described, for example, in the patent U.S. Pat. No. 5,234,030 which corresponds to French Patent FR-2,679,299, and the teaching of which is incorporated into the present description by way of reference.

The essential application of this known solenoid valve is the production of braking systems for motor vehicles, provided with a wheel anti-lock function.

More precisely, the function of this solenoid valve is to regulate the braking pressure coming from the master cylinder actuated by the driver of the vehicle and/or from a pump which is substituted for it by way of a source of high pressure, so as to prevent untimely locking of the wheels.

However, insofar as the stability of a vehicle under braking is dangerously compromised when braking is not applied predominantly to the front wheels, and insofar as it is moreover indispensable, for any braking circuit, to envisage the possibility of breakdowns likely to affect it, the known solenoid valve cannot in practice be used without recourse to an additional regulator, which is installed in the braking circuit of the rear wheels, and whose function is to prevent this circuit from receiving the same pressure as the braking circuit for the front wheels, even in the event of electrical failure of the solenoid valve or of its supply circuit.

SUMMARY OF THE INVENTION

The invention lies within this context and its object is to provide on the one hand a method for regulating the hydraulic pressure in a braking circuit which makes it possible to prevent a loss in stability of the vehicle under braking, even in these extreme situations and without recourse to any additional regulator and, on the other hand, a solenoid valve which meets the requirements of this method.

The solenoid valve of the invention, which moreover complies with the preamble of the present description, is essentially characterized in that its outlet permanently communicates with the third orifice and in that the first and second orifices are, inside the bore, isolated from one another by the slide valve, which results in the fact that the outlet of the solenoid valve is isolated from the high-pressure inlet as long as the valve is not open.

Thus, in the event of electrical failure, the braking circuit which the solenoid valve operates, and which is connected to its outlet, receives no pressure rather than receiving too high a pressure which, in the absence of a regulator, would unbalance the vehicle and would merely cause the wheels to slip, which is totally ineffective for braking.

For example, the cross-section for differential pressure consists of the cross-section of a reaction chamber hollowed longitudinally out of the slide valve, closed in a substantially hermetic fashion by at least one needle and permanently communicating with the low-pressure inlet.

According to a first possible embodiment of the invention, the reaction chamber may be blind and closed by a single needle secured to the body.

According to another possible embodiment of the invention, the slide valve is pierced along its entire length with a stepped duct, the reaction chamber then consisting of a portion of this duct and being closed by two respective needles of different diameter and which can slide freely relative to each other and relative to the body.

The method of the invention, which relates to the regulation of the hydraulic pressure in a braking circuit for a motor vehicle provided with a wheel anti-lock function, and which comprises the operations consisting in:

connecting a front brake motor to a source of low pressure with a head loss which decreases for increasing values of a first operating current, connecting the said front brake motor to a source of high pressure with a head loss which increases for increasing values of the said first operating current;

connecting a rear brake motor to the said source of low pressure with a head loss which decreases for increasing values of a second operating current, and connecting the said rear brake motor to the said source of high pressure with a head loss which increases for increasing values of the said second operating current, is essentially characterized in that it comprises at least the additional operation consisting in preventing the link between the rear brake motor and the source of high pressure for a zero value of the second operating current.

Other features and advantages of the invention will emerge clearly from the description thereof given hereafter by way of non-limiting indication with reference to the appended drawings, in which:

DETAILED DESCRIPTION OF THE INVENTION

Figure 1:
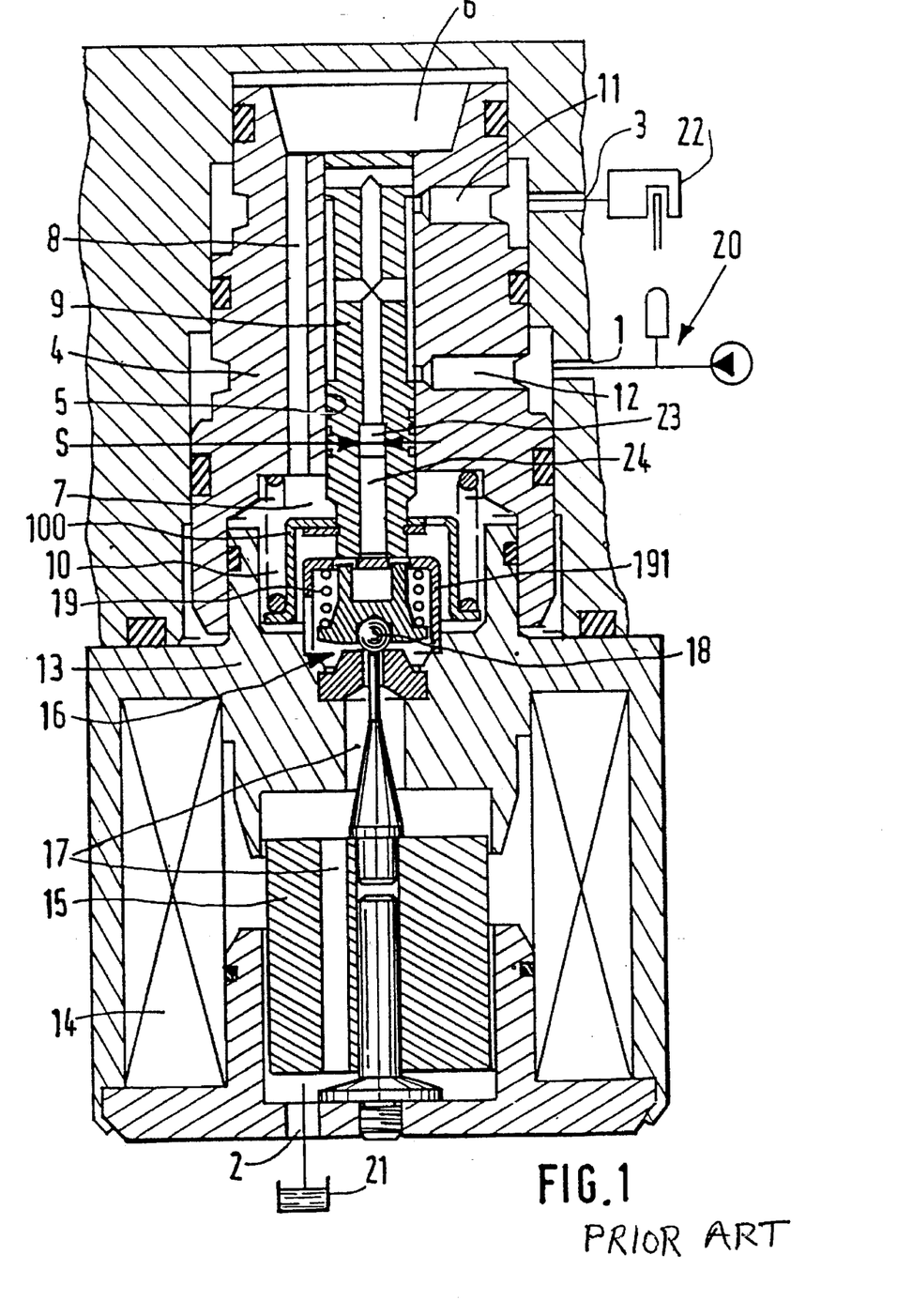
FIG. 1 is a diagrammatic sectional view of a solenoid valve of the prior art in the position of rest, as described in patent U.S. Pat. No. 5,234,030 corresponding to French Patent FR-2,679,299.
Figure 2:
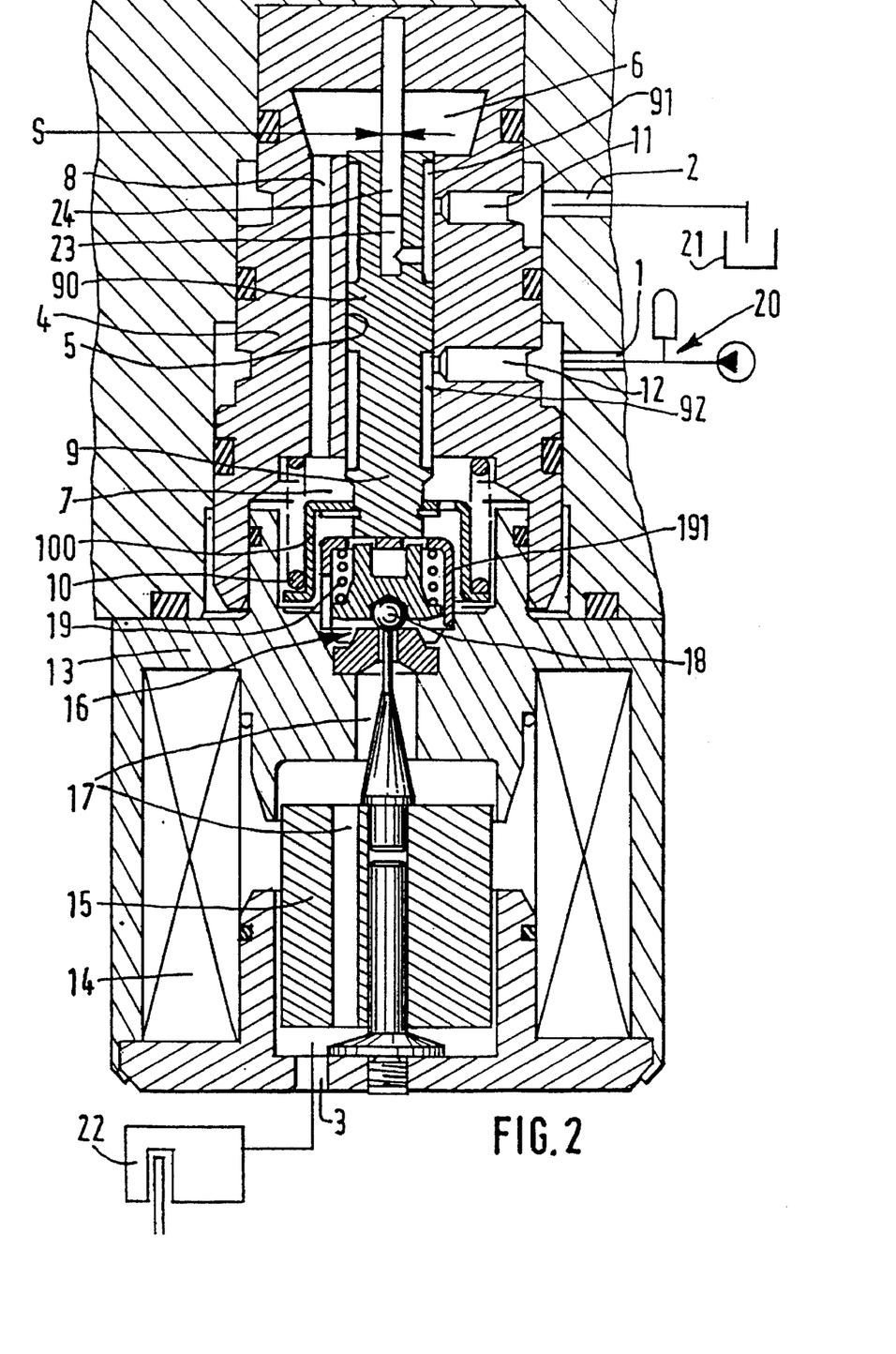
FIG. 2 is a diagrammatic sectional view of a solenoid valve in accordance with a first embodiment of the invention, represented in the position of rest.

The similarity in presentation of FIGS. 1 and 2 has been chosen to allow an appreciation to be gained of the characteristics common to the invention (FIG. 2) and to the prior art (FIG. 1), as well as their differences.

As these figures show, the invention relates, in a known fashion, to a proportional solenoid valve for regulating the pressure of a hydraulic fluid, this valve being provided overall with a high-pressure inlet 1, with a low-pressure inlet 2, and with an outlet 3 on which it can deliver the fluid under a controlled pressure.

More precisely, this solenoid valve comprises:

a body 4 pierced with a bore 5 connecting first and second end chambers 6 and 7 together, these further being connected to one another permanently by a longitudinal duct 8;

a regulating slide valve 9 sliding within the bore 5 and having a cross-section S for differential pressure capable of constituting the seat of application of a first force, due to the pressure, and capable of urging this slide valve towards the first end chamber 6;

a spring 10 or any other elastic means exerting a second force of elastic nature, pointing in the opposite direction from the first force, on the slide valve;

first and second orifices 11, 12 passing through the body 4 and emerging in the bore 5 respectively close to the first and second chambers, one of these orifices, for example 12, being connected to the high-pressure inlet 1;

a casing 13 mounted in the extension of the body 4 in order to close off the second end chamber 7 in hermetic fashion, and in which there are housed an electric coil 14 and a magnetic core plunger 15, this core plunger being capable of sliding in order to exert on the slide valve a third force of electromagnetic origin, and in the same direction as the first force exerted by the pressure on the slide valve; and a valve 16 placing the second end chamber 7 selectively in communication with a third orifice 17 made in the casing, this valve including a shut-off member, for example a ball 18, which can be shifted from its shut-off position by the core plunger against a return force, exerted by a spring 19 and which is able in turn, after a non-zero travel, to transmit to the slide valve 9 the force developed by the electromagnetic 14-15.

This slide valve can thus, depending on the displacements which it undergoes under the effect of the forces which it receives, cause a first communication between the high-pressure inlet 1 and the outlet 3, and a second communication between the low-pressure inlet 2 and this outlet 3, the second communication being moreover favoured over the first for increasing values of the force of electromagnetic origin.

In contrast, the solenoid valve of the invention (FIG. 2) can be distinguished from the known solenoid valve (FIG. 1) by the fact that its outlet 3 permanently communicates with the third orifice 17 and by the fact that the first and second orifices 11 and 12 are, inside the bore 5, isolated from one another by the slide valve 9, the latter having between these orifices 11 and 12 an intermediate portion 90 whose transverse section completely occupies the bore 5.

In the application essentially envisaged for the solenoid valve of the invention, the high-pressure inlet 1 is connected to a source 20 of high pressure which generally consists at least of the pump of the wheel anti-lock system, the low-pressure inlet 2 is connected to the reservoir 21 of brake fluid, and the outlet 3 is connected to the brake motor 22.

As a consequence, it can be understood that, in contrast to what goes on in the solenoid valve of the prior art, in which the outlet 3 is always in communication with the high-pressure inlet 1, the outlet 3 of the solenoid valve of the invention is isolated from the high-pressure inlet 1 as long as the valve 16 is not open.

As FIG. 2 shows, the cross-section S for differential pressure consists of the cross-section of a reaction chamber 23 hollowed out longitudinally from the slide valve, closed in a substantially hermetic fashion by at least one needle 24 and communicating permanently with the low-pressure inlet 2, this reaction chamber being blind in the embodiment of FIG. 2, and closed by a single needle 24 which is secured to the body 4.

The operation of the solenoid valve of the invention is as follows.

In the position in which the electromagnet 14-15 is deactivated, as represented in FIG. 2, the source 20 of pressurized fluid is in communication with the chamber 7 and isolated from the hydraulic motor 22 by virtue of the valve 16 which is normally closed under the action of the spring 19 pressing on the stop 191.

As the two end chambers 6 and 7 communicate with each other via the duct 8, the same pressure is applied to both ends of the slide valve 9, this pressure exerting on the slide valve 9, through the effect of the cross-section S for differential pressure, a force pointing from the bottom upwards against the spring 10 by means of a spring plate 100 and which keeps the slide valve 9 in a position of equilibrium.

In this situation, the reaction chamber 23 is connected to the reservoir 21 by the low-pressure inlet 2 and the intermediate portion 90 of the slide valve 9 makes it possible to isolate the high-pressure orifice 12 from a first annular groove 91 made in this slide valve.

When the intention to apply the brakes is detected, for example in the event of the accelerator pedal being released or contact being made with the brake pedal, the computer (not represented) of the braking system sends a slight electrical current into the coil 14.

This current, flowing through the coil, generates a force which opposes that of the spring 19 and which lifts the ball 18 from its seat, thus placing the end chambers 6 and 7 and the source 20 of high pressure in communication with the hydraulic motor 22.

During the subsequent braking phase, the computer applies sufficient pressure to the motor 22, optimizing the value of the operating current.

More precisely, the force generated by the electric current in the coil opposes the force of the servo spring 10, the valve 16 having evenly distributed fingers on its periphery penetrating into corresponding openings in the spring plate, in order to act on the slide valve 9.

When the strength of the current increases, the valve 16 comes into abutment against the slide valve 9, whose movement against the spring 10 closes a communication established at the edge of a second annular groove 92 of the slide valve 9, thus isolating the source 20 of high pressure from the duct 8, and therefore from the hydraulic motor 22.

At the same time, the edge of the first annular groove 91 places the chamber 6 in communication with the first orifice 11, and therefore the hydraulic motor 22 in communication with the reservoir 21 of brake fluid, this resulting in a drop in the pressure of the fluid in the motor 22.

The person skilled in the art will have understood that the movement of the slide valve 9 against the spring 10 is generated by the electric current in the coil 14 and is moreover favoured by the hydraulic reaction in the reaction chamber 23 which generates a force adding to that produced by the coil and opposing that generated by the servo spring 10.

When the electrical strength decreases, the pressure having dropped in the motor 22, the hydraulic reaction force in the chamber 23 also decreases, and the slide valve shifts in the other direction, closing the communication between the reservoir 21 of brake fluid and the chamber 6 and therefore the motor 22 again, the communication between the high-pressure source 20 and the motor 22 then being reestablished if need be to allow the pressure to rise again in the motor 22.

If the strength of the current injected into the coil increases, a communication between the motor 22 and the reservoir 21 opens again at the edge of the groove 91, and the pressure in the motor 22 drops again.

Thus, any increase in the current in the coil generates a decrease in the pressure in the fluid in the motor 22 and vice versa so that it is possible, by modulating the current flowing through the coil 14, for example by chopping, to give the slide valve 9 a position which depends on the pressure prevailing in the reaction chamber 23, and to apply the desired fluid pressure to the motor 22 by suitably controlling this current.

Nevertheless, in an electrical failure situation manifested for example by the absence of current in the coil, the solenoid valve of the invention returns to the position of rest, thus ensuring complete isolation between the pressurized source 20 and the motor 22.

Figure 3:
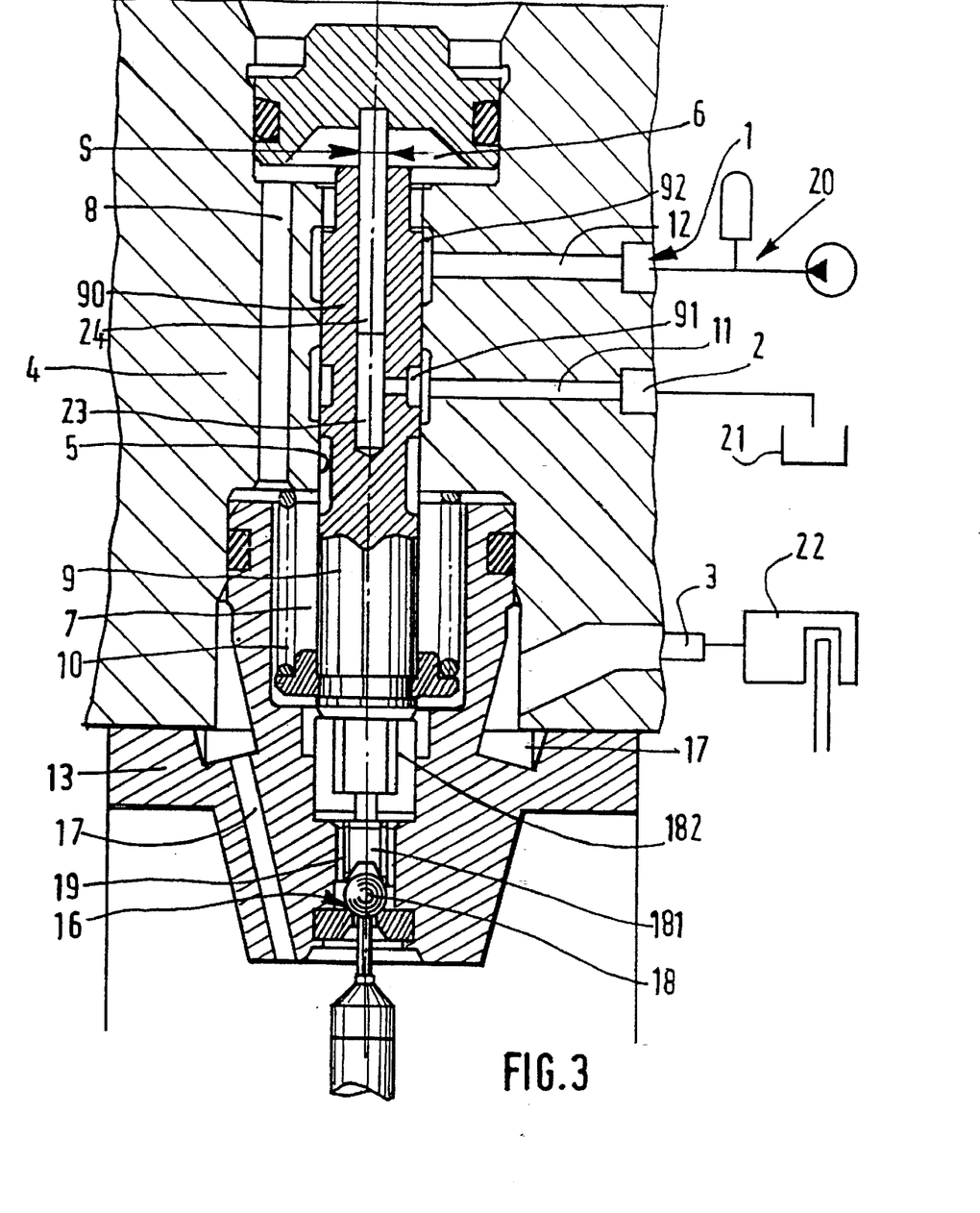
FIG. 3 is a diagrammatic sectional view representing an alternative embodiment of the solenoid valve of FIG. 2, still in the position of rest.

The description just given of the operation of the solenoid valve of FIG. 2 is applicable, give or take a few details, to the operation of the solenoid valve of FIG. 3. Apart from the fact that the valve 16 in this case consists of a cylindrical ball 181 bearing against a ring 182 whose outer edge acts so that it rests against the slide valve 9 in reaction against the spring 19, the only differences compared with FIG. 2 lie in the fact that the positions of the orifices 1 and 2 on the one hand, and of the annular grooves 91 and 92 on the other hand, are reversed, the equilibrium and the direction of the forces involved being in contrast identical.

Figure 4:
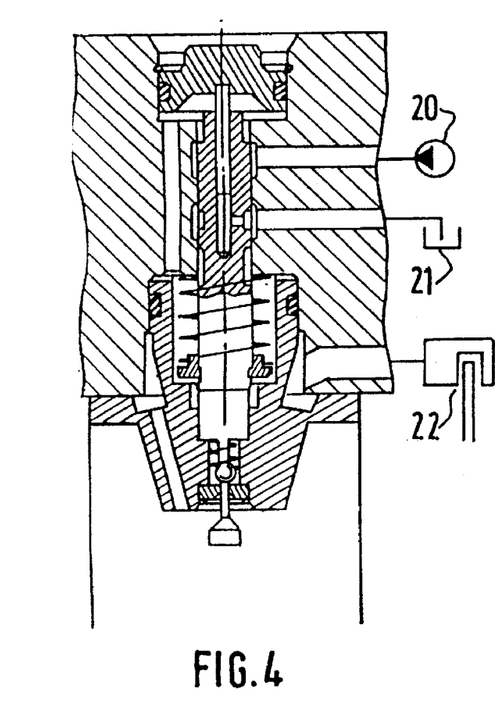
FIGS. 4, 5 and 6 represent, in simplified form, the solenoid valve of FIG. 3 in various positions.
Figure 5:
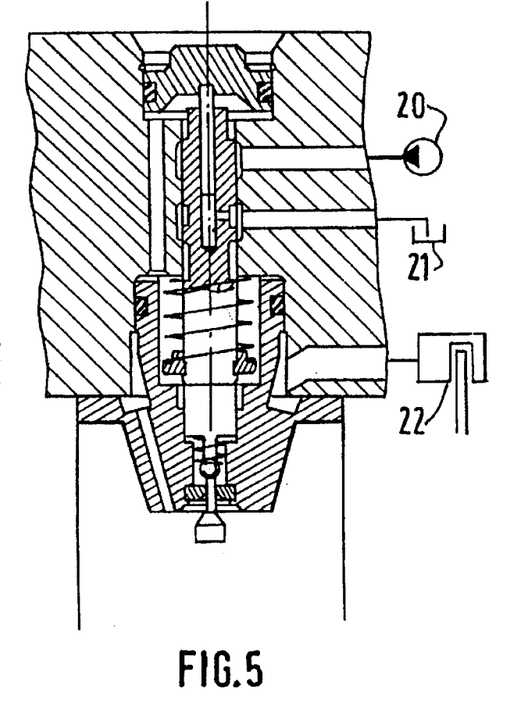
Figure 6:
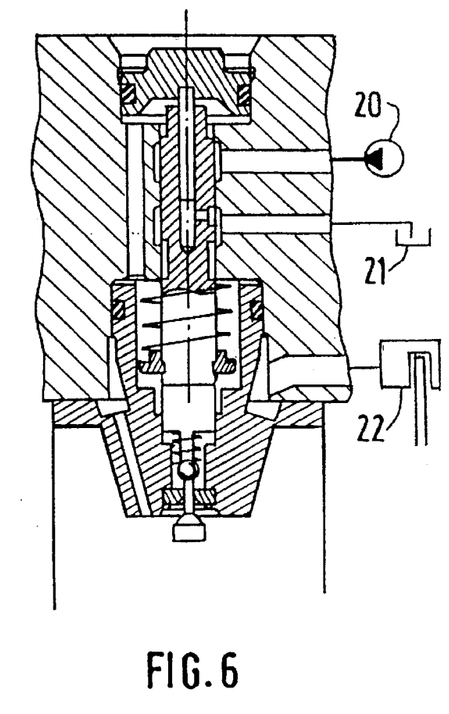

FIGS. 4 to 6 show the solenoid valve of FIG. 3 in the three operating phases described previously.

More precisely, FIG. 4 illustrates the position of rest that this solenoid valve adopts with a zero electric operating current; FIG. 5 illustrates the braking phase corresponding to an increasing electric operating current, for which the slide valve 9 has assumed a position of equilibrium such that the hydraulic motor 22 is isolated both from the source 20 of pressurized fluid and from the reservoir 21; and FIG. 6 illustrates the braking phase corresponding to a strong electric operating current for which the slide valve 9 has assumed a new position of equilibrium such that the hydraulic motor 22 is isolated from the source 20 of pressurized fluid and placed in communication with the reservoir 21.

Figure 7:
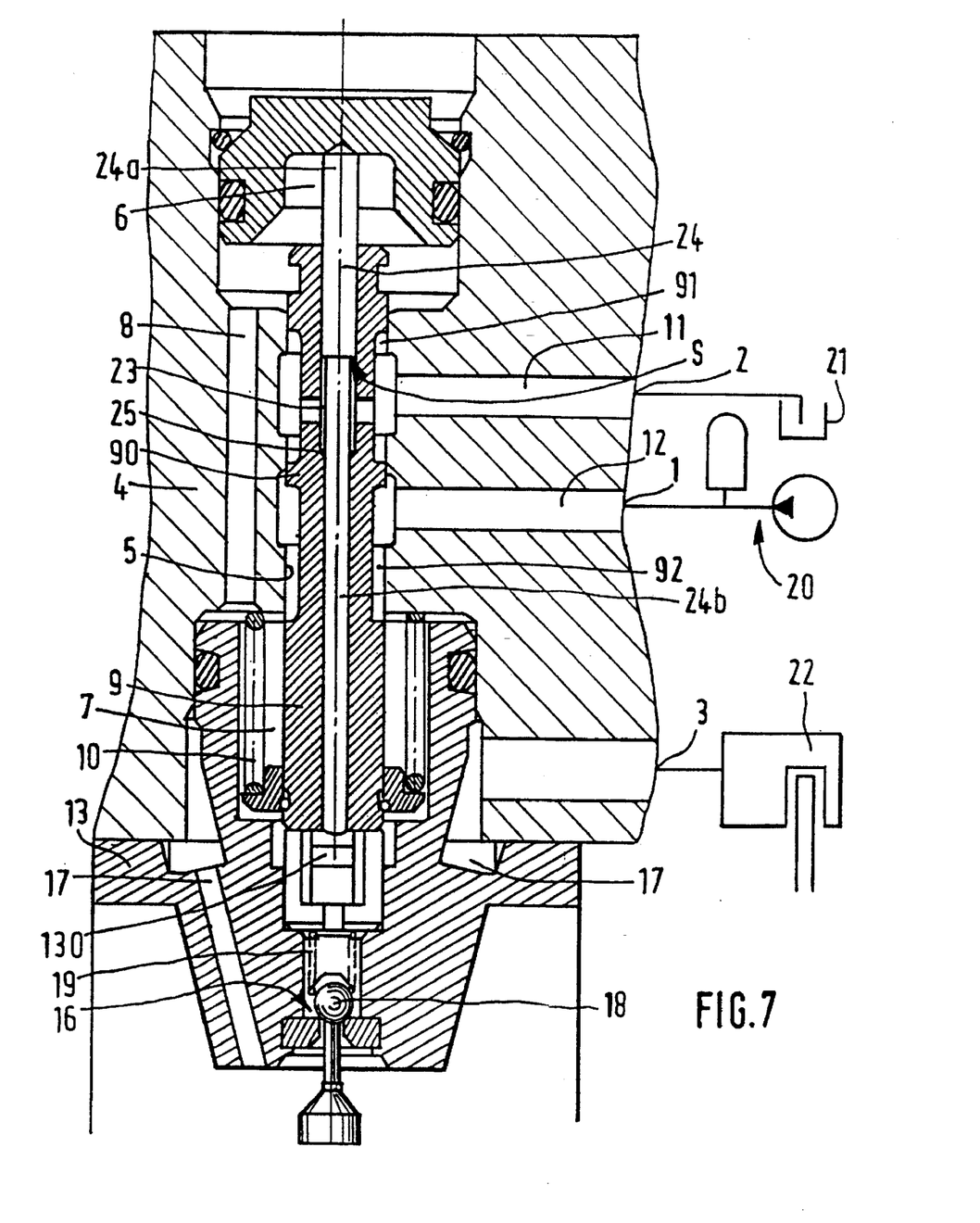
FIG. 7 is a diagrammatic sectional view of a solenoid valve in accordance with a second embodiment of the invention, represented in the position of rest.

The description given above of the operation of the solenoid valve of FIG. 2 is still applicable to the operation of the solenoid valve of FIG. 7, which represents another embodiment of a solenoid valve in accordance with the invention, illustrated in the position of rest.

In this solenoid valve, the slide valve 9 is pierced over its entire length with a stepped duct 25, the reaction chamber 23 consisting of a portion of this duct which is closed by two respective needles 24a and 24b, these needles having different diameters and sliding freely relative to each other and relative to the body 4.

In this embodiment, the orifices 1 and 2 are arranged as in FIG. 2 as are the annular grooves 91 and 92, the equilibrium and the direction of forces involved being identical, and the cross-section S for differential pressure corresponding to the difference in cross-sections of the two needles.

Figure 8:
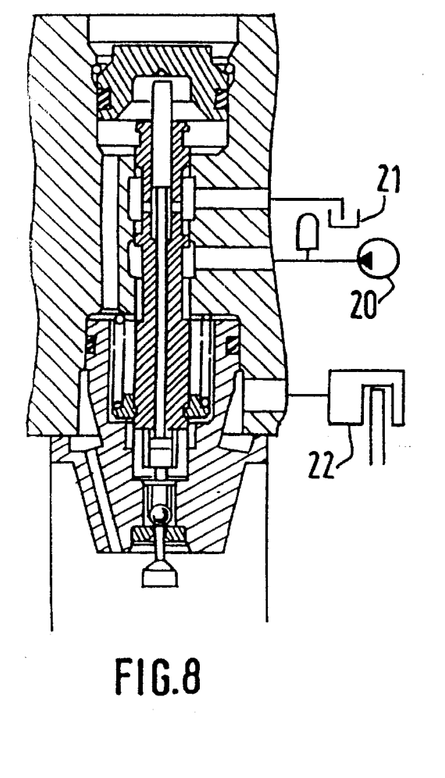
FIGS. 8, 9 and 10 represent, in simplified form, the solenoid valve of FIG. 7 in various positions.
Figure 9:
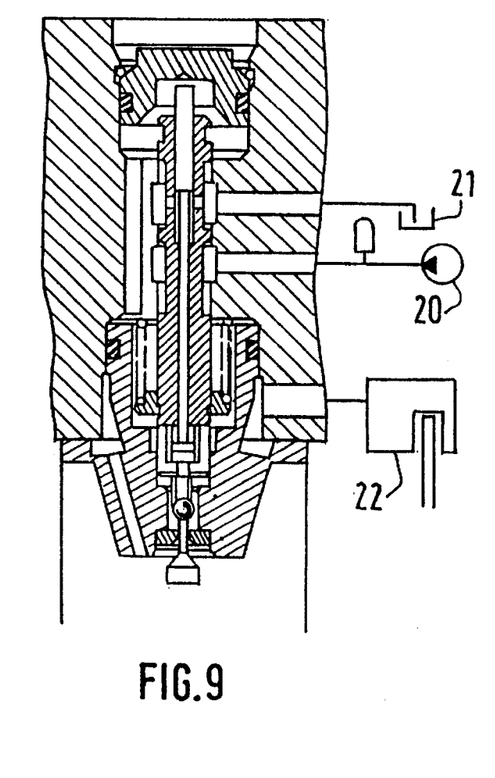
Figure 10:
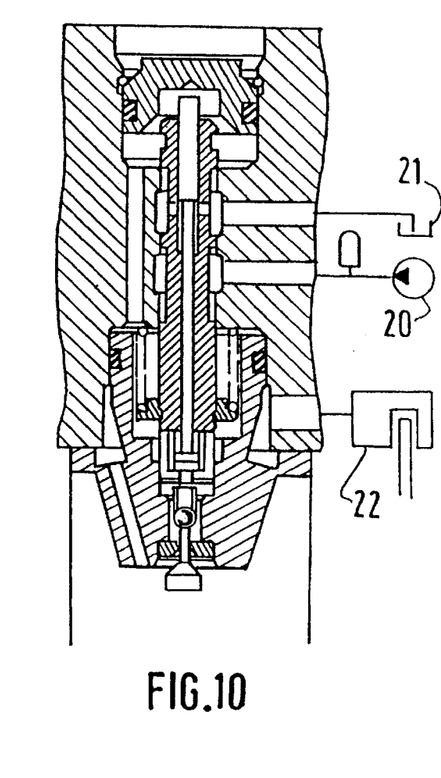

Moreover, the valve 16 is identical to the one described in FIG. 3, a stop 130 rigidly connected to the casing 13 however being provided in order to offer the needle 24b a support. FIGS. 8 to 10 show the solenoid valve of FIG. 7 in the three operating phases described previously.

More precisely, FIG. 8 illustrates the position of rest that this solenoid valve adopts for a zero electric operating current; FIG. 9 illustrates the braking phase corresponding to an increasing electric operating current, for which the slide valve 9 has assumed a position of equilibrium such that the hydraulic motor 22 is isolated both from the source 20 of pressurized fluid and from the reservoir 21; and FIG. 10 illustrates the braking phase corresponding to a strong electric operating current, for which the slide valve 9 has assumed a new position of equilibrium such that the hydraulic motor 22 is isolated from the source 20 of pressurized fluid and placed in communication with the reservoir 21.

Figure 11:
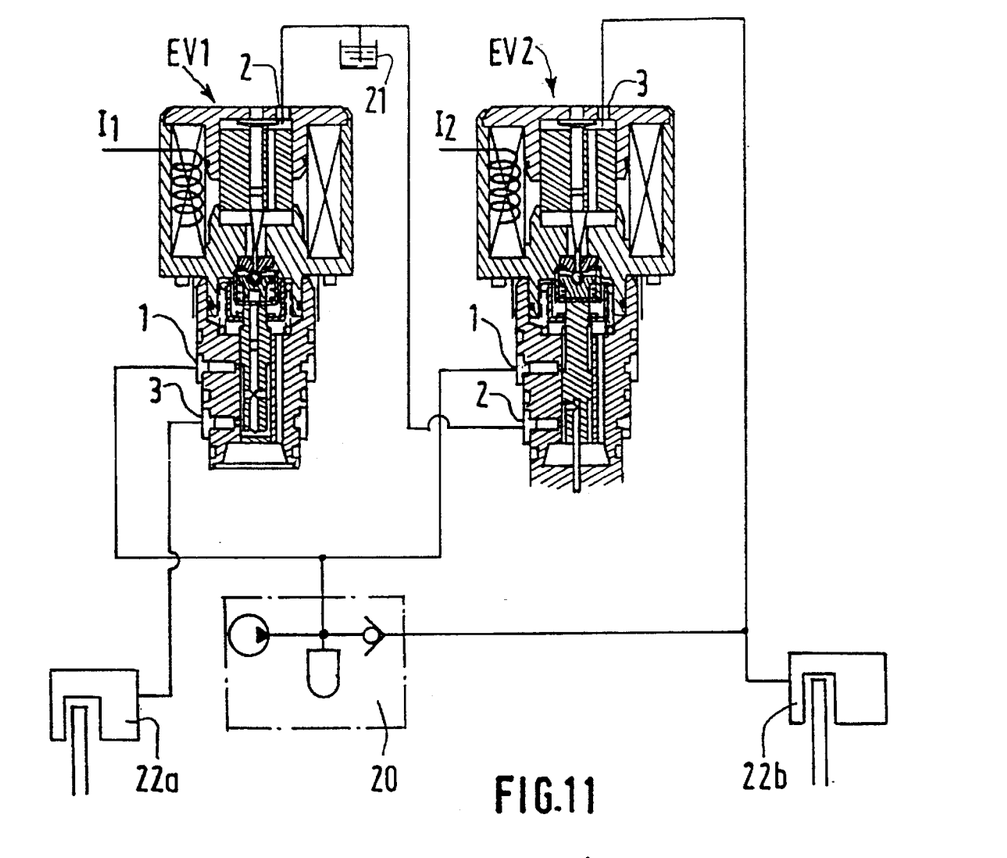
FIG. 11 is a diagrammatic representation of a braking circuit implementing the method of the invention.

FIG. 11 is a diagrammatic representation of a braking circuit for a motor vehicle equipped with a wheel anti-lock function, and the operation of which illustrates the method of the invention.

In this diagram, EV1 denotes, for example, the solenoid valve of FIG. 1, this solenoid valve making it possible, in a known fashion, to connect a front brake motor 22a on the one hand with a source 21 of low pressure, with a head loss which decreases for increasing values of a first operating current I1 injected into this solenoid valve and, on the other hand, to a source 20 of high pressure, with a head loss which increases for increasing values of this first operating current I1.

In contrast, EV2 denotes a solenoid valve in accordance with the invention, this solenoid valve being connected to a rear brake motor 22b and making it possible, as has just been described, to connect this rear brake motor 22b on the one hand to the source 21 of low pressure, with a head loss which decreases for increasing values of a second operating current I2 injected into the solenoid valve EV2 and, on the other hand, to the source 20 of high pressure, with a head loss which increases for increasing values of the second operating current I2, this solenoid valve EV2 nevertheless preventing, as has just been described, the link between the rear brake motor 22b and the source 20 of high pressure for a zero value of the second operating current I2.

Figure 12:
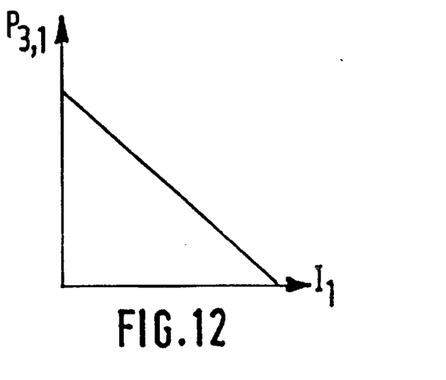
FIG. 12 is a diagram representing a functional characteristic of the solenoid valve of FIG. 1.

FIG. 12 illustrates the main functional characteristic of the solenoid valve EV1 of FIG. 11, in the form of a graph which has the pressure P3,1 delivered at the outlet 3 of this solenoid valve EV1 on the ordinate axis, and the strength I1 of the first operating current that this solenoid valve receives, on the abscissa axis.

Figure 13:
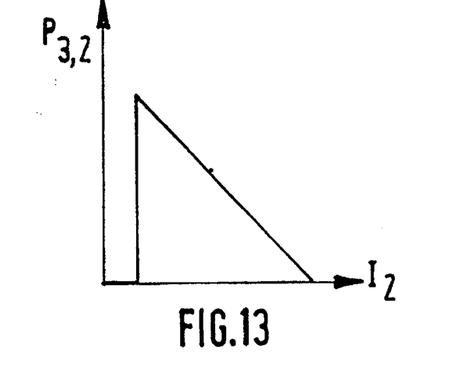
FIG. 13 is a diagram representing a functional characteristic of a solenoid valve in accordance with the present invention.

Finally, FIG. 13 illustrates the main functional characteristic of the solenoid valve EV2 of FIG. 11, in the form of a graph having the pressure P3,2 delivered on the outlet 3 of this solenoid valve EV2 on the ordinate axis, and the strength I2 of the second operating current that this solenoid valve receives on the abscissa axis.

We claim:

1. A proportional solenoid valve for regulating the pressure of a hydraulic fluid, said valve having a high-pressure inlet, a low-pressure inlet, and an outlet through which fluid can be delivered under a controlled pressure, said solenoid valve comprising:

a body pierced with a bore for connecting a first end chamber with a second end chamber, said body having a duct to permanently connect said first end chamber with said second end chamber;

a regulating slide valve located in said bore and having a cross-section responsive to differential pressure for developing a first force capable of urging said slide value towards said first end chamber;

an elastic means for exerting a second force on said slide valve in opposition said first force;

first and second orifices passing through said body and emerging in the bore respectively close to said first and second chambers, one of said first and second orifices being connected to said high-pressure inlet;

a casing mounted in an extension of said body to close off said second end chamber in hermetic fashion, said housing an electric coil and a magnetic core plunger, said core plunger being capable of sliding in order to exert a third force on said slide valve in the same direction as said first force; and a control valve for selectively placing said second end chamber in communication with a third orifice located in said casing, said control valve including a shut-off member which can be shifted from a shut-off position by movement of said core plunger against a return force, and which is able, after a non-zero travel, in turn transmits said third force to said slide valve, said slide valve being capable of bringing about a first communication between said high-pressure inlet and said outlet, and a second communication between said low-pressure inlet and said outlet, and functioning toward said second communication over said first communication with increasing values of said third force, characterized in that said outlet permanently communicates with said third orifice and in that said first and second orifices are located inside said bore and isolated from one another by said slide valve, which results in said outlet being isolated from said high-pressure inlet as long as said control valve is not open.

2. The solenoid valve according to claim 1, characterized in that said cross-section for differential pressure consists of the cross-section of a reaction chamber hollowed longitudinally out of said slide valve and is closed in a substantially hermetic fashion by at least one needle and permanently in communication with said low-pressure inlet.

3. The solenoid valve according to claim 2, characterized in that said reaction chamber is blind and closed by a single needle secured to said body.

4. The solenoid valve according to claim 2, characterized in that said slide valve is pierced along its entire length with a stepped duct, said reaction chamber consisting of a portion of said duct which is closed by two respective needles of different diameter and which can slide freely relative to each other and relative to said body.

* * * * *